April 21, 1970    S. A. LADA    3,507,640
APPARATUS FOR PRESS-MOLDING HOLLOW GLASS ARTICLES
Filed May 3, 1967    4 Sheets-Sheet 2

INVENTOR.
S.A. LADA
BY
E.J. Hollowit
W.A. Schaich
ATTORNEYS

United States Patent Office 3,507,640
Patented Apr. 21, 1970

3,507,640
APPARATUS FOR PRESS-MOLDING HOLLOW GLASS ARTICLES
Sigismund A. Lada, Columbus, Ohio, assignor to Owens-Illinois, Inc., a corporation of Ohio
Filed May 3, 1967, Ser. No. 635,907
Int. Cl. C03b 11/02
U.S. Cl. 65—308                                3 Claims

ABSTRACT OF THE DISCLOSURE

This invention relates to apparatus for press-molding molten glass and particularly to a machine for press-molding hollow glass articles which are formed in hollow molds by a press plunger or ram, the body mold having a separable ring mold which is independently supported and operated, the mechanism being adapted to locking the ring and body molds together during pressing.

---

The invention in a preferred embodiment and as herein illustrated and described is comprised in a press-molding machine designed for molding large hollow glass articles, such as face plates for television picture tube envelopes, although the machine may also be used for molding various other forms of hollow glassware. The machine conventionally comprises a horizontal mold table intermittently rotated, step by step, about a vertical axis with a plurality of molding units mounted on the mold table which are brought in succession to a press-molding station. The machine is especially adapted to molding hollow glass articles having a bottom or body portion and a cylindrical or rectangular-shaped annular rim portion extending upwardly from the bottom portion of the article. Each molding unit comprises a body mold and a ring mold for forming the annular rim portion of the hollow article. Frequently, an outer ring, or shell, surrounding the ring mold is necessary to permit lifting the ring mold from the body mold leaving the newly-formed article free for removal following set-up of the glass. Removal of the ring mold is necessary due to the upper rim area of the article having a re-entrant contour on its exterior surface in many cases.

Previously, in the press-molding of hollow glass articles such as TV face plates, a plurality of ring molds have been used to cooperate with a plurality of body molds mounted around the ring table, such as disclosed in U.S. Patent No. 2,840,954 to Ramsey. In this invention, the ring mold and body mold members are temporarily clamped together at the pressing station by clamping means which consist of holding fingers pivotally mounted at the press-molding station on opposite sides of the mold. As an alternative to employing a plurality of ring molds, the invention disclosed and claimed by U.S. Patent No. 2,839,970 to Denman comprises a press plunger which carries a single ring mold on the plunger head, the ring mold being held down on the body mold by the pressure of the plunger head during its continuing downward movement by which the molten glass charge is press formed.

Both of the above-referenced prior art disclosures have inherent disadvantages either requiring a plurality of ring molds which are individual to each of the body molds during a lengthy period of the molding cycle, or alternately, employing a single ring mold mounted on and operated by the press plunger. The disadvantages inherent in both of these press-forming machines are obvious requiring, in the one case, utilization of a considerable number of ring molds while operating the same in such manner so as to remove the ring mold prior to removal of the article from the mold, and then returning the ring to the body mold prior to pressing. In the alternative case, employing a single ring mold carried by the plunger, uneven forming pressure is frequently encountered during the pressing stroke of the plunger, such as when the spring plate carrying the ring mold is stopped by the lowermost position of the ring mold contacting the mold bottom, the plunger head then continuing its downward stroke to fully form the article. Inherent variations in pressing pressure and non-uniformity of plunger movement can result in inheret defects in the molded article such as so-called plunger or impact marks. The present invention obviates the deficiencies of the prior art and provides improved apparatus which offers marked advantages thereover.

Accordingly, it is an object of the present invention to provide improved apparatus for press-molding hollow glass articles including a separately operable ring mold which functions positively to cooperate with the body mold independently of the plunger.

Another object of this invention is to provide apparatus for molding hollow glass articles wherein an annular ring mold is capable of independent vertical movement and locked assembly with the mold bottom prior to the working stroke of the pressing plunger, the latter being fully capable of delivering controlled pressing pressure to the mold assembly.

Another object of the present invention is to provide novel combined apparatus which permits positive engagement of a single annular ring mold with a series of body molds in succession, the ring mold being operable vertically into and out of firm engagement with an individual body mold at the pressing station completely independently of the pressing plunger.

Other objects of the invention will appear more fully hereinafter.

Referring to the accompanying drawings which illustrate a press-molding machine with which my invention is utilizable:

Figure 1:
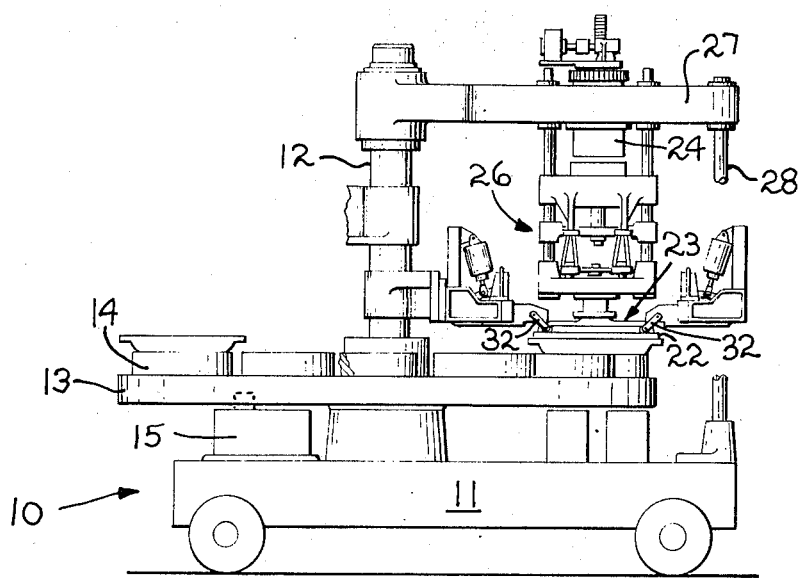
FIG. 1 is an illustration of a machine embodying the present invention with several parts broken away.
Figure 2:
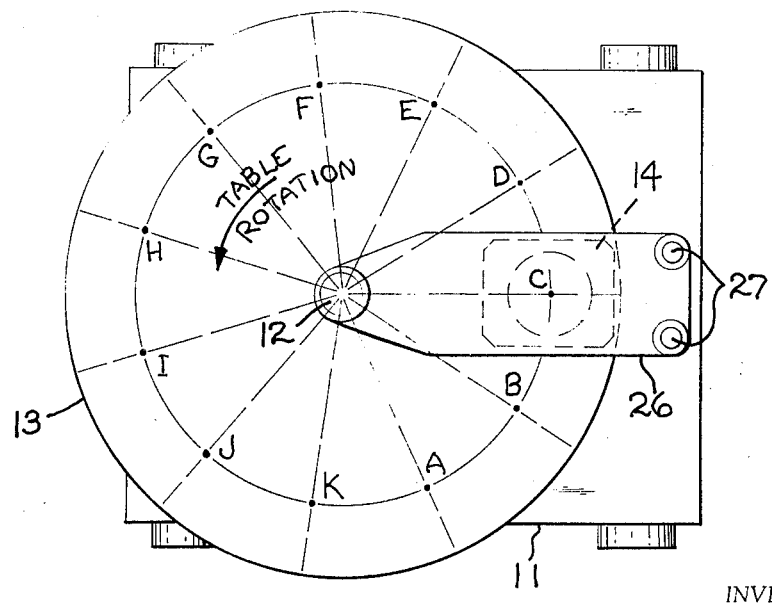
FIG. 2 is a diagrammatic plan view of the machine.

Referring to FIG. 1, the operating parts of the machine 10 are mounted on a machine base 11 carrying a vertical column 12. A fold carriage 13 is mounted for rotation on a horizontal plane about the axis of column 12. Molding units or assemblies 14 are mounted on the carriage 13 uniformly spaced circumferentially around the periphery of the carriage or mold table. The carriage is rotated intermittently, step by step, by a table drive mechanism 15 which may be of conventional construction as known in the art. Each mold unit is brought by rotation of the mold carriage to stations lettered A to K as shown diagrammatically in FIG. 2. The various stations include a mold charging station A, at which a charge or gob of molten glass is introduced into each mold; a press molding station C, where the article is press-molded; a take-out station F, at which the newly-formed article is removed from the mold; intermediate cooling stations, at which the article is cooled to set up the newly-formed glass; and stations at which the mold is empty.

Each rotational step of the mold table is through an angular distance twice that between adjoining stations so that the article formed at station C makes more than one complete revolution with the mold carriage before it stops at take-out station F. Actually each newly-pressed article travels about 1¼ revolutions around the carriage before its removal from the mold bottom. Following the press-molding at station C, each article is held stationarily at the cooling stations E, G, I, K, B and D in succession before being stopped at the take-out station F for removal of the molded article at this station. The mold remains empty while stopped at stations G and J prior to its return arrival at mold charging station A. Obviously, each of the mold bottoms follows this cycle on the mold table.

Figure 3:
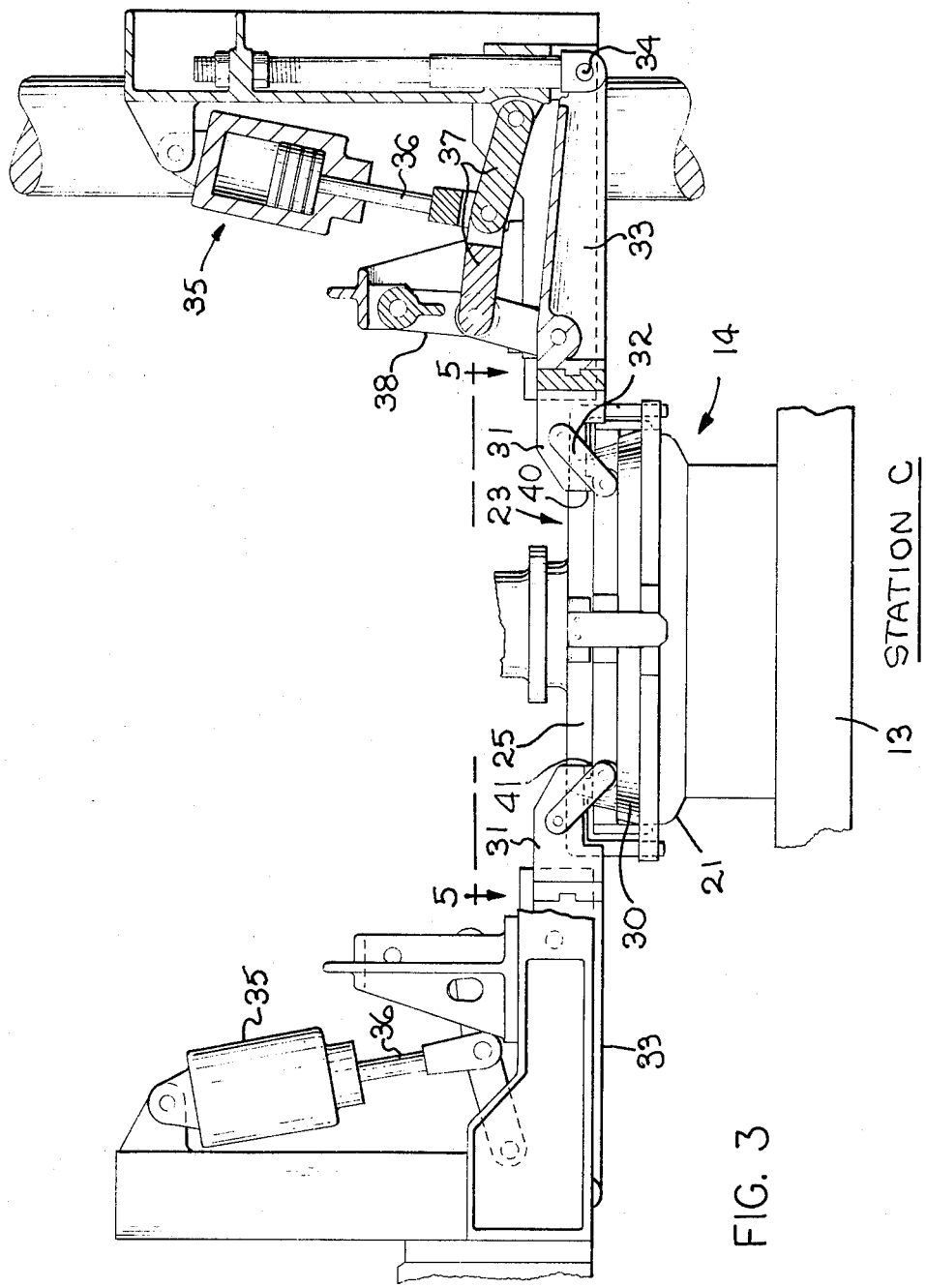
FIG. 3 is an enlarged part sectional illustration of the press-moving station of the machine.
Figure 4:
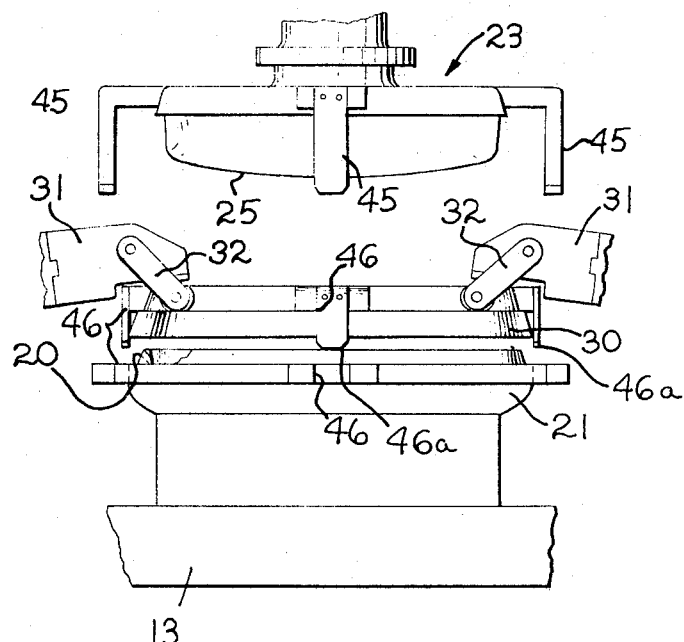
FIG. 4 is a view similar to FIG. 3 showing the plunger and shell ring in elevated position.

The molds as shown are designed for molding rectangular face plates for television picture tube envelopes. As shown in FIG. 3, each mold unit assembly 14 comprises a body or bottom mold 21 which is adapted to molding the bottom portion of the hollow face plate. A single annular ring mold 30 is mounted at station C over and above the mold table to cooperate with each mold bottom 21 while in residence at the pressing position. When a charge of molten glass has been dropped into the mold bottom 21 at the charging station A, the next rotational step of the carriage through two stations brings the mold directly beneath the press plunger or ram 23 at station C. The plunger is reciprocatably moved down and then up by a fluid-operated motor 24. The plunger normally comprises a molding head 25 having a contour suitably shaped to mold the inner surface of face plate 20. The plunger head 25 is mounted on the lower extremity of the piston motor assembly. Plunger head 25 is shown in FIG. 4 indicating its upward pre-pressing position relative to and spaced above mold bottom 21 when the mold arrives at pressing station C. Plunger head 25 and its operating toggle mechanism 26 are supported by a horizontal arm 27 mounted on column 12 and a pair of outboard vertical standards 28 as known in the art.

In accordance with my invention, when bottom mold 21 arrives at the pressing station C, a single ring mold 30 which is mounted in vertical alignment with plunger head 25 is lowered onto the mold bottom. As shown in FIG. 3, ring mold 30 is supported by a pair of U-shaped supporting and hold-down members 31 which are located on opposite sides of the ring mold. Pivotally connected link members 32 serve to interconnect U-shaped members 31 to opposing sides of ring mold 30. One pair of link members 32 interconnected one side of the ring mold to the projecting arms of each U-shaped supporting member 31. Thus, the juxtaposed U-shaped members 31 retain ring mold 30 in a horizontal plane in vertically operable relation and in axial alignment with plunger head 25.

Figure 5:
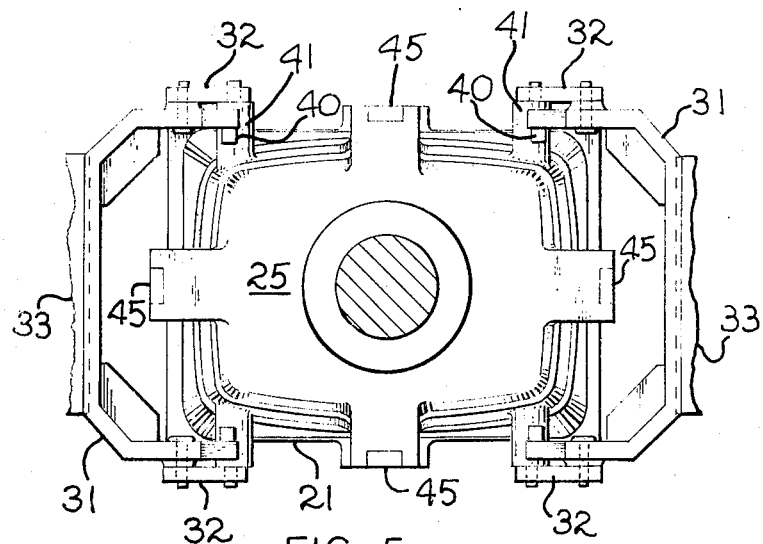
FIG. 5 is a sectional plan view taken on the line 5—5 of FIG. 3.
Figure 6:
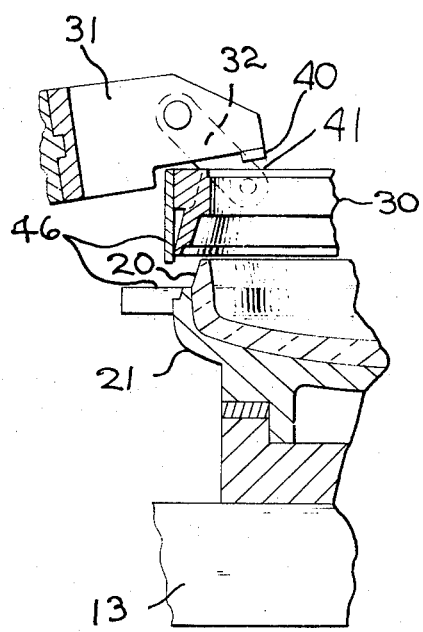
FIG. 6 is a vertical sectional view of a molding unit on a relatively large scale at the pressing station.

As shown in FIG. 3 and FIG. 5, U-shaped members 31 are mounted on the cantilevered ends of pivoted horizontal arm members 33, the arm members projecting toward each other in cantilevered relation into proximity with ring mold 30. Each of the arm members 33 is pivoted about a point 34 to facilitate its limited angular movement in a vertical plane. Each arm 33 is movable upwardly by a fluid-actuated motor 35, the piston rod 36 of the piston-cylinder assembly operating through a toggle arrangement consisting of two pivotally-connected generally horizontal arms 37 interconnecting with two transversely-disposed pivoted arms 38, the lower of which interconnects with arm 33 to raise and lower the same. Thus, when the pair of fluid-actuated motors 35 are operated in synchronism, arm members 33 are pivoted upwardly to raise ring mold 30 vertically a short distance above mold bottom 31 to facilitate angular rotation of the table therebeneath for ingress of a charged mold and egress of a mold containing a newly-formed article.

U-shaped supporting and hold-down members 31 each have downwardly-projecting lugs 40 located at the projecting extremities of their bifurcated arms adapted to contact loading pads 41 on the upper surface of ring mold 30. Thus, when ring mold 30 is lowered from its elevated uppermost position as shown in FIG. 4 to its descended lowermost position as shown in FIG. 3 resting on mold bottom 21, lugs 40 are placed in forceful contact with loading pads 41 to lock the ring and body molds 30 and 21 respectively into firmly clamped arrangement.

The plunger head 25 has a series of downwardly-projecting tongue or pin elements 45, preferably a series of four pins having smoothly-tapered lowered extremities adapted to penetrate and engage complemental grooves formed in similarly-spaced alignment in the periphery of ring mold 30 and mold bottom 21. FIGS. 4 and 5 illustrate the pins 45 mounted on the plunger in rectangular array adapted to penetrate the slots or recesses in the grooved elements 46 of the mold parts. FIG. 4 further illustrates the downwardly projecting portions 46a of the grooved elements 46 which interconnect with suitable openings in the mold bottom. The several mold parts and plunger are thereby guided into precise vertical alignment on pressing high-quality hollow articles having optical properties.

Briefly stated, when the mold table is indexed to bring a charged mold bottom 21 to the pressing station C, the ring mold 30 is lowered in synchronism by the pair of piston motors 35, the cylinders thereof operating their pistons downwardly to thereby apply downward clamping pressure to the ring and body mold components by means of the cantilevered lugs 40 of U-shaped supporting and hold-down members 31. The ring mold protuberances 46a engage suitable grooves or recesses in the mold bottom for their precise alignment. Thus, the component parts 21 and 30 of the mold assembly are tightly clamped together in alignment for press-molding of the article. When the pressing plunger is operated downwardly by piston motor 24, the downwardly directed pins 45 engage the recesses in grooved elements 46 of the mold unit and are thereby guided into accurate alignment. The plunger seats on the glass to fully form the article within the mold interior, following which it is retracted upwardly. After the plunger is raised, the ring mold is the raised sufficiently high by piston motors 35 to allow the mold bottom to rotate therebeneath. The mold bottom then carries the article from the pressing station.

Significant advantages of the present invention reside in the plunger and ring mold elements being completely separate and independently-operable components of the pressing assembly. When the plunger is in its elevated position, it is completely clear for surface treatment such as by spraying or swabbing during continuous operation of the press-molding equipment. When a single ring is mounted on the press head surrounding the plunger, the side surfaces of the plunger are frequently masked to prevent their inspection or treatment. Most importantly, the plunger head is capable of delivering a uniform, controllable pressing stroke to the charge in the mold bottom without the occurrence of so called plunger or impact mark in the finished workpiece. Also, it is much simpler to replace either the plunger or ring mold when they are separately supported over the mold path.

In practicing the present invention, more precise dimensional characteristics can be obtained in the final article. The hold-down arrangement wherein each pair of supporting links is pivotally mounted intermediate the supported end of the U-shaped hold-down member with its holding lugs projecting to its extremity permit positive clamping of the mold parts during the pressing operation. The combined apparatus is applicable to use in long-term campaigns in the manufacture of various types of hollow glassware without interruption due to actuating failure such as may occur when the single ring mold is carried by the plunger head. Essentially all of the disadvantages found in the prior art of utilizing one or more ring molds are substantially eliminated by the present invention.

Various other embodiments and modifications may be carried out within the spirit and scope of the appeneded claims.

What is claimed:
1. In an apparatus for press molding a hollow glass article having a concavo-convex body portion surrounded by an upstanding peripheral rim portion, said apparatus including a body mold having a concave upper surface and a surrounding shortened rib for defining the exterior bottom surface of the article and a limited portion of the rim exterior surface respectively, a molding plunger having a convex exterior surface for defining the interior bottom surface and the entire rim interior surface of said article, and means for vertically moving said plunger downwardly to permit its partial telescoping within said body mold to confine an article-forming glass charge therebetween; the improvement comprising an annular ring mold seatably engageable with said body mold and extending peripherally around said plunger in radially spaced relation thereto, said ring mold cooperative with said body mold rib to define the remaining portion of said article rim exterior surface, means on said body mold and said ring mold adapted to guide the same into accurate cooperative alignment, a pair of U-shaped supporting and hold-down members linkably connected to opposing sides of said ring mold adapted to cooperatively support the same in horizontal relation, and operative means connected to said pair of supporting and hold-down members adapted to move said ring mold reciprocatably vertically into and out of seatable engagement with said body mold independently of said plunger.

2. The apparatus in accordance with claim 1, wherein said operative means connected to said pair of hold-down members adapted to move said ring mold reciprocatably vertically comprises a pair of juxtaposed fluid-actuated motors each interconnected to said U-shaped supporting and hold-down members on opposite sides of said plunger.

3. The apparatus in accordance with claim 1, wherein said pair of U-shaped supporting and hold-down members are mounted in vertically movable relation on opposing sides and above said body mold independently of both said body mold and said plunger, each U-shaped member having a pair of protuberances on juxtaposed sides adapted to forcefully contact said ring mold in its lowermost pressing position for positive engagement of said ring and body molds.

References Cited

UNITED STATES PATENTS

| 2,840,954 | 7/1958 | Ramsey | 65—307 |
| 2,853,835 | 9/1958 | Tallent | 65—308 |

ARTHUR D. KELLOGG, Primary Examiner

U.S. Cl. X.R.

65—310, 323